United States Patent [19]

Matsuhisa et al.

[11] Patent Number: 5,460,099
[45] Date of Patent: Oct. 24, 1995

[54] DYNAMIC VIBRATION ABSORBER FOR PENDULUM TYPE STRUCTURE

[76] Inventors: Hiroshi Matsuhisa, 1-22-27, Hieidaira, Otsu-shi, Shiga-ken; Masashi Yasuda, Hyogo-ken, both of Japan

[73] Assignee: Hiroshi Matsuhisa, Hieidaira, Tokkyokiki Corporation, Hyogo-Ken; Anzensakudo Co., Ltd, Kohga-Gun; all of Japan.

[21] Appl. No.: 220,287

[22] Filed: Mar. 30, 1994

[30] Foreign Application Priority Data

Mar. 30, 1993 [JP] Japan .................. 5-071696

[51] Int. Cl.⁶ .................................................. B61B 3/00
[52] U.S. Cl. .................... 105/148; 105/149.1; 105/156; 104/115
[58] Field of Search ...................... 105/148, 149, 105/149.1, 149.2, 150, 152, 156; 104/173.1, 174, 175, 115, 116

[56] References Cited

U.S. PATENT DOCUMENTS

| | | | |
|---|---|---|---|
| 3,106,171 | 10/1963 | Julien | 105/149 |
| 3,170,412 | 2/1965 | Sowder | 105/149.2 |
| 3,511,186 | 5/1970 | Barthalon | 105/150 |
| 3,543,687 | 12/1970 | Ellzey | 105/149 |
| 3,759,185 | 9/1973 | Scherbatskoy | 105/149 |
| 5,113,768 | 5/1992 | Brown | 105/149.2 |

FOREIGN PATENT DOCUMENTS

| | | | |
|---|---|---|---|
| 204330 | 12/1986 | European Pat. Off. . | |
| 206348 | 12/1986 | European Pat. Off. . | |
| 474269 | 3/1992 | European Pat. Off. . | |
| 205974 | 1/1909 | Germany . | |
| 140562 | 8/1930 | Switzerland . | |
| 0742212 | 6/1980 | U.S.S.R. | 105/149 |
| 0850454 | 7/1981 | U.S.S.R. | 105/149 |
| 0867736 | 9/1981 | U.S.S.R. | 105/149 |

OTHER PUBLICATIONS

O. Nishihara, et al., "*Vibration Damping Mechanisms with Gyroscopic Moments*", JSME International Journal, Series III, vol. 35, No. 1, pp. 50–55 (1992). (Translation included).

H. Matsuoka, et al., "*Control of the Rolling Motion of a Ropeway Gondola by a Gyro Device*", Proceedings of JSME, No. 920–55, vol. B, pp. 178–183, (1992).

H. Kanki, et al., "*Development of CMG Active Vibration Control Device for Gondola*", The First International Conference on Motion and Vibration Control (MOVIC), pp. 310–314 (1992).

H. Sato, et al., "*Swing Reduction of Gondola Lift Carriers by Pendulum-Type Dynamic Absorber*", Proceedings of JSME, No. 910–17, vol. C, pp. 528–530, (1991).

H. Sato, et al., "*Swing Control of Gondola Lift Carriers by an Inclined Double-Pendulum-Type Damping Equipment*", Proceedings of JSME, No. 920–55, vol. A, pp. 592–597, (1992).

*Primary Examiner*—Mark T. Le
*Attorney, Agent, or Firm*—Ostrolenk, Faber, Gerb & Soffen

[57] ABSTRACT

A dynamic absorber for a pendulum type structure is particularly useful for suppressing swing. In operative association with the pendulum type structure, the dynamic absorber is provided above the center of gravity of the pendulum type structure such that the dynamic absorber can apply damping force to the pendulum type structure.

7 Claims, 10 Drawing Sheets

DYNAMIC VIBRATION ABSORBER FOR PENDULUM TYPE STRUCTURE

BACKGROUND OF THE INVENTION

1. Field of the Invention

The present invention relates to a dynamic absorber for a pendulum type structure such as a cable suspension transporter (gondola lift).

2. Description of the Prior Art

In recent years, cable suspension transporters used in skiing grounds or sightseeing places have been under discussion for adoption as transport means in cities, by virtue of their low construction cost as compared with monorail and the like. However, the largest disadvantage of those cable suspension transporters is their weakness to wind. Because of their structure, transporters suspended from steel cables are easily affected by the drag of wind. Accordingly, presently the operation of such transporters is stopped at a wind velocity of approximately 15 m/s, but they need to be operable for at least a wind velocity around 20 m/s to useful as a means of city transport. Thus, a technique for damping wind-excited vibration of cable suspension transporters gains considerable public attentions. However, general translational motion models cannot be applied to this technique, which necessitates a new technique for damping the vibrations of rigid pendulums.

As a concrete damping techniques for cable suspension transporters, there has conventionally been proposed using gyroscopic moment (Nishihara, Matsuhisa, and Sato, Vibration Control Mechanism Using Gyroscopic Moment, Transactions of JSME, C, 57-534(1991), 497; Matsuoka and Nishida, Preventive Control of Swing of Gondola Lift by Using Gyroscopic Moment, Proceedings of JSME, No. 920-55, B (1992), 178). As for these, a trial product for six-passenger transporter has already been manufactured (Kanki H., Nekomoto Y. and Monobe H., Development of CMG Active Vibration Control Device for Gondola, The First International Conference on Motion and Vibration Control (MOVIC), (1992), 310), in which swing caused by wind is reduced to about ⅓. However, this has a problem in that since the cable suspension transporter is not connected to an external power supply, there arises a need of developing a power-saving system which can be driven by batteries.

Further, there has been proposed another damping technique using dynamic absorber on which there has been discussed using a spring-mass type absorber or pendulum type absorber (Sato and Chishima, On Reduction in Swing of Cable Suspension Transporter by Pendulum-Type Dynamic Absorber, Proceedings of JSME, C, No. 910-17(1991), 528). The spring-mass type absorber, when provided in proximity to the center of gravity of the transporter, would operate in such a way that the mass of the transporter and that of the dynamic absorber will move integrally with each other, resulting in no damping effect.

On the other hand, as for the pendulum type absorber, in the case that it is provided below the transporter as a double-pendulum system, since it requires a long arm of an additional pendulum for optimal tuning, it becomes impractical. Moreover, it is also discussed that the length of the arm be shortened by reducing the natural frequency as a result of inclining the pendulum (Sato, Hosokawa, and Chishima, Control of Swing of Cable Suspension Transporters by Inclined Pendulum Type Damper, Proceedings of JSME, A, No. 920-55(1992), 592). In this case, there would arise a problem as to the position where the dynamic absorber should be provided.

SUMMARY OF THE INVENTION

The present invention has been developed to solve the foregoing problems of the conventional techniques, and its object is to provide a dynamic absorber for a pendulum type structure, which is particularly useful for suppressing the swing.

To achieve the above object, the present invention provides a dynamic absorber which is appended to a pendulum type structure and provided above the center of gravity of the pendulum type structure such that the dynamic absorber applies a damping force to the pendulum type structure.

With the above-described construction of the invention, a relative displacement is generated between the element of the dynamic absorber and the pendulum type structure that supports it, so that the vibration energy of the pendulum type structure can be absorbed.

DETAILED DESCRIPTION OF THE PREFERRED EMBODIMENTS

An embodiment of the present invention is now described with reference to the accompanying drawings.

Figure 1:
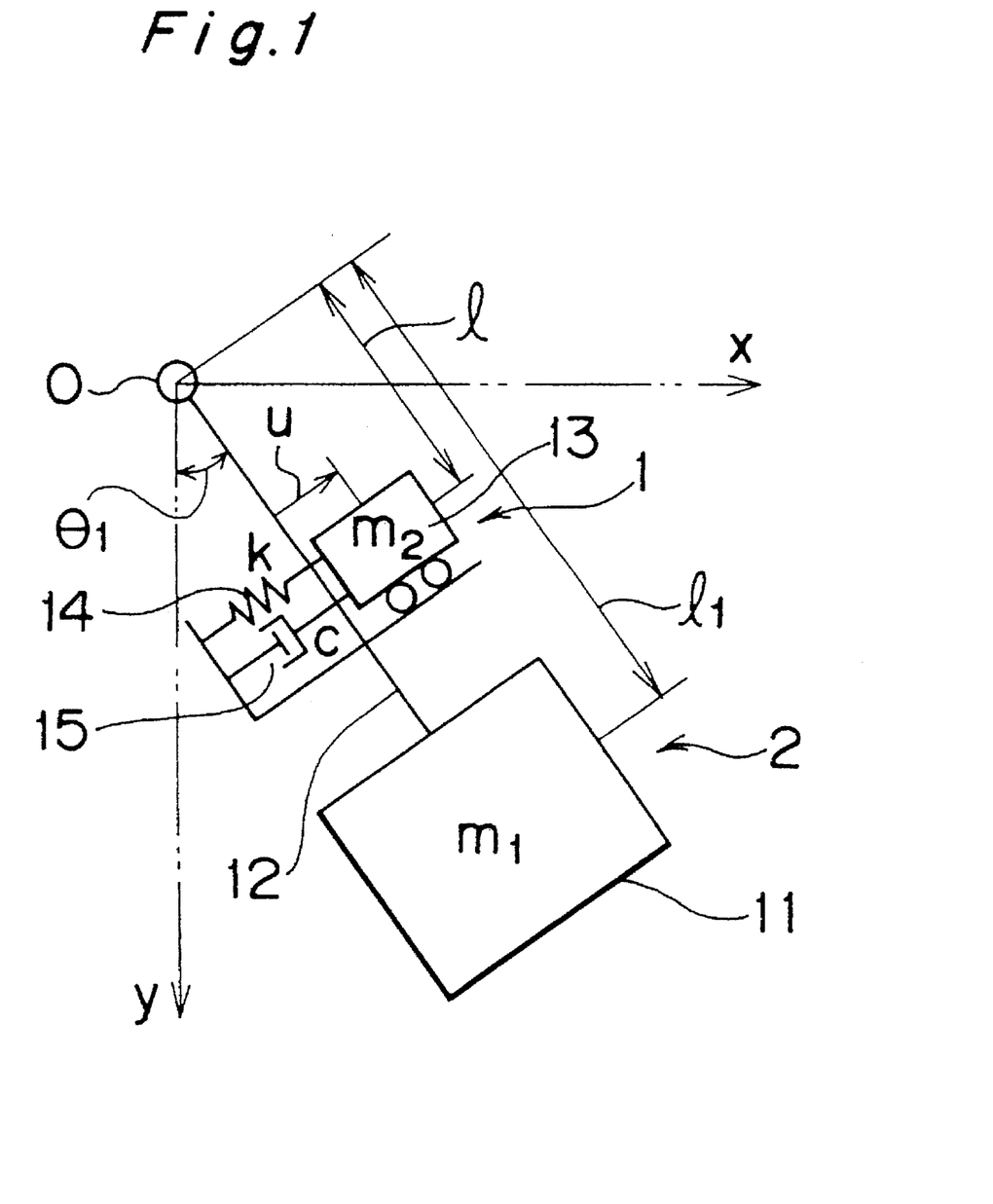
FIG. 1 is a view showing the outline of the overall construction of a pendulum type structure to which a dynamic absorber according to a first embodiment of the present invention is applied.

FIG. 1 schematically illustrates components of a pendulum type structure 2 to which a spring-mass type dynamic absorber 1 according to a first embodiment of the present invention is applied.

A suspended member 11 is suspended such that it can swing by a supporting portion O (represented by a point in FIG. 1, and referred to as fulcrum O) via a link 12, where the suspended member 11 and the link 12 constitute a pendulum type structure 2 with a mass $m_1$ (hereinafter, referred to as mass $m_1$), for example, a cable suspension transporter. The dynamic absorber 1 is provided above the center of gravity of the mass $m_1$, for example, between the suspended member 11 and the fulcrum O in this embodiment, such that the dynamic absorber 1 applies damping force to the mass $m_1$. Accordingly, the dynamic absorber 1 is not restricted in configuration to but is shown as functionally divided into a mass element 13 with a mass $m_2$, (hereinafter, referred to as mass $m_2$), linear movable transversely of the link 12, a spring element 14 of a spring constant k interposed between the mass $m_2$ and the link 12, and a damper element 15 of a damping coefficient c which operates in parallel to the spring element 14.

Further, in operative association with the mass $m_1$, the dynamic absorber 1 is provided above the center of gravity of the mass $m_1$ as described above such that, as described below, the dynamic absorber 1 is optimally tuned to the natural vibration of the pendulum motion of the mass $m_1$ depending on the appended mass ratio, thus applies damping force thereto.

Next, vibration of the mass $m_1$ to which the above-described dynamic absorber 1 has been applied is theoretically analyzed.

Equations of motion

As shown in FIG. 1, the mass $m_1$ is provided so as to be able to swing about the fulcrum O, with its degree of freedom assumed to be 1 and its damping neglected. It is also assumed that the distance from the fulcrum O to the center of gravity of the mass $m_1$ is $l_1$ and its angular displacement is $\theta_1$. The dynamic absorber 1 is provided at a distance 1 from the fulcrum O, and the displacement of the mass $m_2$ transverse of the link 12 is assumed to be u. As described above, the spring constant of the spring element 14 is assumed to be k, and the damping coefficient of the damper element 15 is assumed to be c. Further, taking the fulcrum O as origin to establish the x, y coordinates as shown in FIG. 1, the position of the center of gravity of the mass $m_1$ ($x_1$, $y_1$) and the position of the center of gravity of the mass $m_2$ ($x_2$, $y_2$) can be represented by the following Equations (1) through (4):

$$x_1 = l_1 \sin \theta_1 \qquad (1)$$

$$y_1 = l_1 \cos \theta_1 \qquad (2)$$

$$x_2 = l \sin \theta_1 + u \cos \theta_1 \qquad (3)$$

$$y_2 = l \cos \theta_1 - u \sin \theta_1 \qquad (4)$$

Thus, velocities of both masses are expressed by the following Equations (5) through (8):

$$\dot{x}_1 = l_1 \dot{\theta}_1 \cos \theta_1 \qquad (5)$$

$$\dot{y}_1 = -l_1 \dot{\theta}_1 \sin \theta_1 \qquad (6)$$

$$\dot{x}_2 = l\dot{\theta}_1 \cos \theta_1 + \dot{u} \cos \theta_1 - u\dot{\theta}_1 \sin \theta_1 \qquad (7)$$

$$\dot{y}_2 = -l\dot{\theta}_1 \sin \theta_1 - \dot{u} \sin \theta_1 - u\dot{\theta}_1 \cos \theta_1 \qquad (8)$$

Kinetic energy T results as shown in the following equation (9), and positional energy V is represented by the following equation (10) if the gravity acceleration is g, and dissipation function F is represented by the following equation (11):

$$T = \frac{1}{2} m_1 l_1^2 \dot{\theta}^2 + \frac{1}{2} m_2(l^2 \dot{\theta}^2 + \dot{u}^2 + u^2 \dot{\theta}^2 + 2l\dot{u}\dot{\theta}) \qquad (9)$$

$$V = m_1 g l_1(1 - \cos\theta_1) + m_2 g\{l(1 - \cos\theta_1) + u\sin\theta_1\} + \frac{1}{2} ku^2 \qquad (10)$$

$$F = \frac{1}{2} c\dot{u}^2 \qquad (11)$$

From these equations, the following equations (12) and (13) can be obtained according to Lagrange's equation of motion in which the external force acting on the mass $m_1$ is represented as $Pe^{i\omega t}$:

$$m_1 l_1^2 \ddot{\theta}_1 + m_2(l^2\ddot{\theta}_1 + 2u\dot{e},dot \ u\dot{\theta} + ee_1 + u^2\ddot{\theta}_1 + l\ddot{u}) + m_1 g l_1 \sin \theta_1 + m_2 g(u \cos \theta_1 + l \sin \theta_1) = Pl_1 e^{i\omega t} \qquad (12)$$

$$m_2(l\ddot{\theta}_1 + \ddot{u}) + m_2 g \sin \theta_1 - m_2 u\dot{\theta}_1^2 + c\dot{u} + ku = 0 \qquad (13)$$

With $\theta_1$ and U assumed to be infinitesimal quantities, if high-order terms of Equations (12) and (13) are omitted and linearized, then the following Equations (14) and (15) are obtained:

$$(m_2 l^2 + m_1 l_1^2)\ddot{\theta}_1 + m_2 l\ddot{u} + (m_2 l + m_1 l_1)g\theta_1 + m_2 g u = Pl_1 e^{i\omega t} \qquad (14)$$

$$m_2 l\ddot{\theta}_1 + m_2 \ddot{u} + c\dot{u} + m_2 g\theta_1 + ku = 0 \qquad (15)$$

As a result of this, complex amplitude $\theta_1$, U of displacement can be represented by the following Equations (16) and (17):

$$\theta_1 = (-m_2 \omega^2 + k + i\omega c)Pl_1/Z \qquad (16)$$

$$U = (m_2 l\omega^2 - m_2 g)Pl_1/Z \qquad (17)$$

$$Z = \{-(m_1 l_1^2 + m_2 l^2)\omega^2 + (m_1 l_1 + m_2 l)g\} \times (-m_2 \omega^2 + k + i\omega c) - (-m_2 l\omega^2 + m_2 g)^2$$

At this point, for making the equations dimensionless, symbols as represented in Equation (18) are introduced into the equations:

$$\mu = m_2/m_1, \ \gamma = l/l_1, \ \Omega^2 = g/l_1$$

$$\omega_a^2 = k/m_2, \ \zeta = c/2m_2\Omega, \ f = \omega_a/\Omega \qquad (18)$$

$$h = \omega/\Omega, \ \theta_{st} = P/(m_1 g), \ U_{st} = Pl_1/(m_1 g)$$

Displacements of the main system (pendulum type structure 2) and the appended system (dynamic absorber 1) are represented as the following Equations (19) to (22):

$$\theta_1 = \frac{A + i2\zeta B}{C + i2\zeta D} \theta_{st} \quad (19)$$

$$|\theta_1| = \sqrt{\frac{A^2 + 4\zeta^2 B^2}{C^2 + 4\zeta^2 D^2}} \ \theta_{st} \quad (20)$$

$$U = \frac{E}{C + i2\zeta D} U_{st} \quad (21)$$

$$|U| = \sqrt{\frac{E^2}{C^2 + 4\zeta^2 D^2}} \ U_{st} \quad (22)$$

where $A = f^2 - h^2$ $B = h$ $C = (1-h^2)(f^2-h^2) - \mu(\gamma f^2 - 1)(\gamma h^2 - 1)$ $D = \{1 + \mu\gamma - (1\mu\gamma^2)h^2\}h$ $E = -(1-\gamma h^2)$ Optimum adjustment Equation (20) represents frequency response of the main system angular displacement, and has two resonant frequencies and one anti-resonant frequency as a vibratory system of two degree-of-freedom. Also, this frequency response passes two fixed points P and Q regardless of the value of damping ratio $\zeta$. Therefore, by making the two points P and Q equal in height to each other, and making them maximum, optimum natural frequency ratio $f_{opt}$ of dynamic absorber 1 to the main system $f_{opt}$ and optimum damping ratio $\zeta_{opt}$ of the dynamic absorber 1 can be obtained (Den Hartog, Mechanical Vibrations, (1950) McGraw-Hill).

First, from the condition that the frequency response passes fixed points, i.e. that Equation (20) becomes an identity with respect to $\zeta$, the frequencies of the fixed points P and Q, i.e. $h_p$ and $h_q$ as shown in the following Equation (23) are determined:

$$h_{p,q} = \sqrt{a \mp \sqrt{a^2 - b}} \quad (23)$$

$$a = \frac{1 + f^2(1 + \mu\gamma^2)}{2 + \mu\gamma^2}$$

$$b = \frac{2(1 + \mu\gamma)f^2 - \mu}{2 + \mu\gamma^2}$$

Then, since the fixed points P and Q are equal in height to each other, the optimum natural frequency ratio $f \equiv f_{opt}$ of the dynamic absorber 1 to the main system is determined as shown in the following Equation (24):

$$f_{opt} = \frac{\sqrt{1 + 2\mu\gamma + \mu^2\gamma^3}}{1 + \mu\gamma^2} \approx \frac{\sqrt{1 + 2\mu\gamma}}{1 + \mu\gamma^2} \quad (24)$$

Frequencies $h_p$ and $h_q$ of the two fixed points P and Q, respectively, in this case are represented by the following Equations (25) and (26):

$$h_p^2 = \frac{(1 + \mu\gamma)(2 + \mu\gamma^2) - (1-\gamma)\sqrt{\mu^2\gamma^2 + 2\mu}}{(1 + \mu\gamma^2)(2 + \mu\gamma^2)} \quad (25)$$

$$h_q^2 = \frac{(1 + \mu\gamma)(2 + \mu\gamma^2) + (1-\gamma)\sqrt{\mu^2\gamma^2 + 2\mu}}{(1 + \mu\gamma^2)(2 + \mu\gamma^2)} \quad (26)$$

Further, the amplitudes of the main system at the fixed points P and Q are given by the following Equation (27):

$$|\theta_{1p}| = |\theta_{1q}| = \frac{\sqrt{2 + \mu\gamma^2}}{(1-\gamma)\sqrt{\mu}} \ \theta_{st} \quad (27)$$

Next, such a damping ratio $\zeta$ that the amplitudes of the main system at the fixed points P and Q become maximum is determined from the following Equation (28):

$$\left.\frac{\partial|\theta_1|}{\partial h}\right|_{h=h_p, h_q} = 0 \quad (28)$$

Therefore, a $\zeta$ that satisfies the Equation (28) is the optimum damping ratio $\zeta_{opt}$. By substituting the Equation (20) for the Equation (28), the following Equation (29) is obtained:

$$(AA'+4\zeta^2 BB')(C^2+4\zeta^2 D^2) - (A^2+4\zeta^2 B^2) \times (CC'+4\zeta^2 DD') = 0 \quad (29)$$

where ' represents $\partial/\partial$ and $A' = -2h$ $B' = 1$ $C' = -2(1+f^2)h + 4h^3 - 2\gamma\mu(\gamma f^2 - 1)h$ $D' = 1 + \mu\gamma - 3(1 + \mu\gamma^2)h^2$ From Equation (29) and Equation (20), the following Equation (30) is obtained:

$$\zeta_{opt} = \frac{1}{2} \sqrt{\frac{AA' - |\theta_1/\theta_{st}|^2 CC'}{-BB' + |\theta_1/\theta_{st}|^2 DD'}} \quad (30)$$

Although there is a slight difference between $\zeta_{opt} \equiv \zeta_{popt}$ at which the inclination becomes zero at the fixed point P and $\zeta_{opt} \equiv \zeta_{qopt}$ at which the inclination becomes zero at the fixed point Q, these values are not so different from each other in actual adjustments. Thus, as shown in the following equation (31), an arithmetic mean of $\zeta_{popt}$ and $\zeta_{qopt}$ may also be employed as $\zeta_{opt}$ for optimum adjustment:

$$\zeta_{opt} = \frac{1}{2}(\zeta_{popt} + \zeta_{qopt}) \quad (31)$$

Equivalent mass ratio

Equivalent mass ratio $\mu_e$ representing the efficiency of the dynamic absorber 1 is defined by Equation (19) as below. Therefore, by setting f=1 and h=1 in the real part C of the denominator of Equation (19), the following Equation (32) is obtained:

$$\mu_e = \mu(1-\gamma)^2 \quad (32)$$

By substituting this Equation (32) for Equation (27), amplitudes at the fixed points of the main system are represented by the following Equation (33):

$$|\theta_{1p}| = |\theta_{1q}| = \sqrt{1 + \frac{2 - \mu(1 - 2\gamma)}{\mu_e}} \; \theta_{st} \quad (33)$$

Actually, in this Equation (33), μ assumes a value less than 0.1, while γ, which assumes preferably a smallest possible value, assumes a value around 0.5. As a result, the amplitude can be approximated to $\{1+(2/\mu_e)\}^{1/2}\theta_{st}$, thus the amplitude is expressed by the equivalent mass ratio. From Equation (32), if γ is 1, i.e. if the dynamic absorber 1 is provided at the center of gravity of the mass $m_1$, there is no damping effect, whereas if γ is out of 1, damping effect is developed. Actually, $\mu_e=0.25\mu$ even when γ=½, so that the dynamic absorber 1 is preferably provided at an upper portion as much as possible for enhancing damping effect.

Next described is the physical grounds of why no effect is produced when the dynamic absorber 1 is provided at the center of gravity of the main system ($l=l_1$).

If an equation of Equation (15) multiplied by l is subtracted from Equation (14), then an equation of motion on the rotation of the main system as shown in the following Equation (34) can be obtained:

$$m_1 l_1^2 \ddot{\theta}_1 + m_1 g l_1 \theta_1 - cl\dot{u} + m_2 g u - klu = P l_1 e^{i\omega t} \quad (34)$$

Of the left side of Equation (34), the first term is an inertia term, the second is a restoring moment, the third is moment by damping of the dynamic absorber 1, the fourth is a moment caused by gravity acting on the mass $m_2$ of the dynamic absorber 1, and the fifth is moment caused by the spring element 14 of the dynamic absorber 1. In the optimum tuning, the natural frequency of the dynamic absorber 1 and the natural frequency of the main system are approximately equal to each other, so that an equation $k/m_2=g/l_1$ is satisfied, and the fourth and fifth terms eliminate each other. Accordingly, the main system and the dynamic absorber 1 are coupled with each other only by the dampers of two systems having the same natural frequency, so that they vibrate integrally with each other, where the damping force does not act any more.

Frequency response

Figure 2:
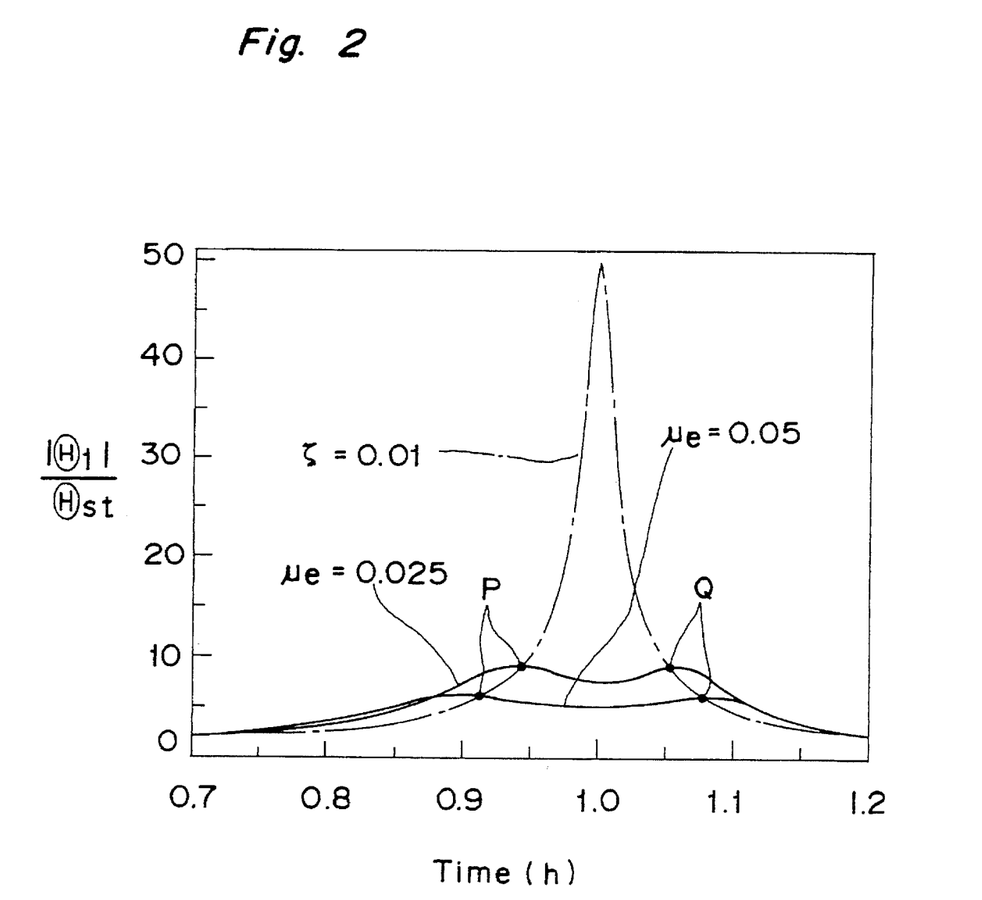
FIG. 2 is a view showing frequency response of a system with the dynamic absorber shown in FIG. 1 and that of the same system without the dynamic absorber.

FIG. 2 shows frequency responses of a system having the dynamic absorber 1 adjusted in an optimum manner and that of another system not having the dynamic absorber 1. Parameters are set to $l_1=4m$ and $m_1=1$ ton, on the assumption of a six-passengers cable suspension transporter as an example. Although the damping ratio of the main system in actual machines is less than 1%, it is assumed as 1% in this example. As shown by one-dot chain line, the dimensionless amplitude $|\theta_1|/\theta_{st}$ at the resonant frequency assumes 50 when the dynamic absorber 1 is not provided. In contrast to this, as shown by solid line, when the dynamic absorber 1 is provided, $|\theta_1|/\theta_{st}$ assumes 9 at equivalent mass ratio $\mu_e=0.025$, and 6.4 at $\mu_e=0.05$. Consequently, it can be said that there is a substantial effect of providing the dynamic absorber 1, and the effect of $\mu_e$ can be found to appear remarkably in damping effect.

Transient response

Figure 3:
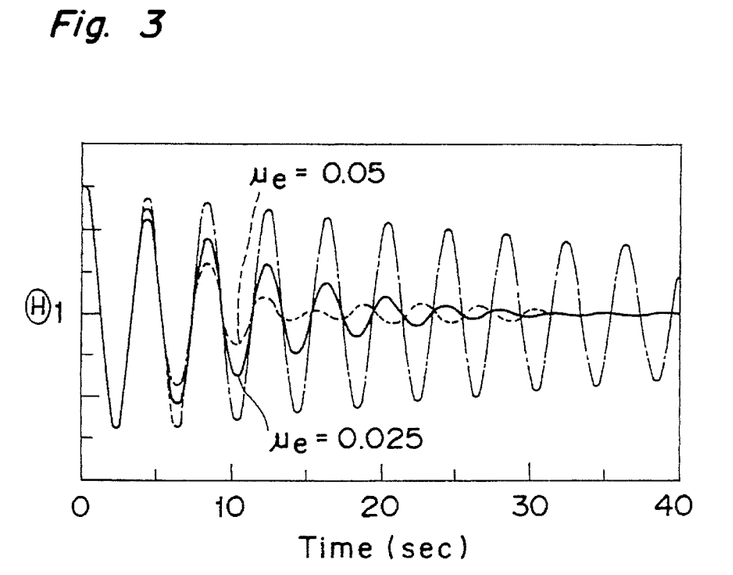
FIG. 3 is a view showing response to an initial displacement of a system with the dynamic absorber shown in FIG. 1 and that of the same system without the dynamic absorber.
Figure 4:
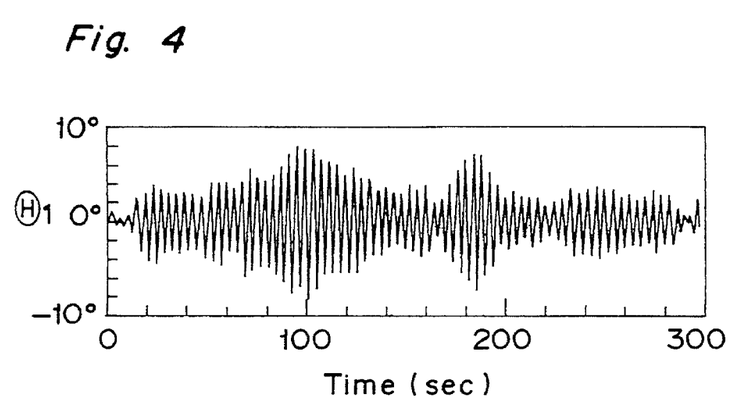
FIG. 4 is a view showing response to random input of the system with the dynamic absorber shown in FIG. 1.
Figure 5:
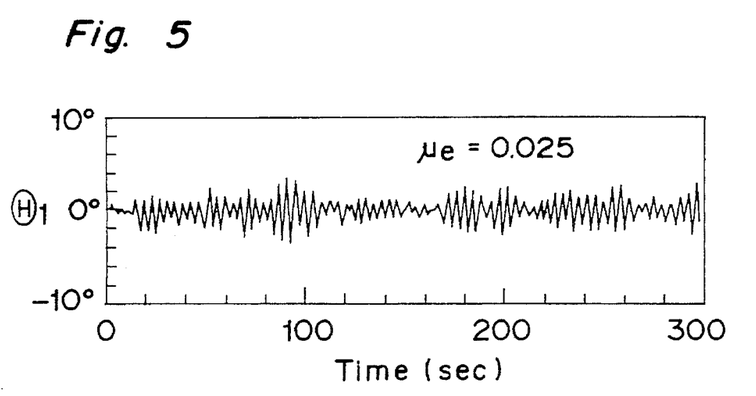
FIG. 5 is a view showing response to random input of the system with the dynamic absorber shown in FIG. 1.
Figure 6:
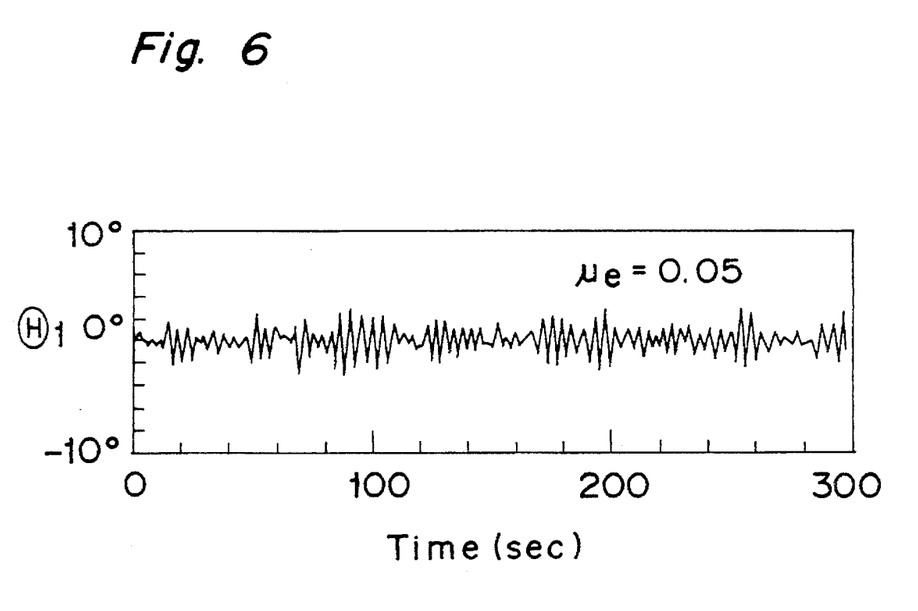
FIG. 6 is a view showing response to random input of the system with the dynamic absorber shown in FIG. 1.

FIG. 3 shows time response to an initial displacement. In this figure, a case in which the dynamic absorber 1 is not provided is shown by one-dot chain line, while other cases in which the dynamic absorber 1 provided are shown by solid line ($\mu_e=0.05$) and broken line ($\mu_e=0.025$). FIG. 4 to FIG. 6 show responses obtained in the case that dimensionless quantity $P/m_1 g$ of the variable component of the external force caused by wind is derived by setting a sampling interval to 0.3 second in normal random numbers having a mean value of 0 and a standard deviation σ=0.0886. This normalized quantity is obtained through numerical simulation by setting a sampling interval to 0.3 second in normal random numbers having a mean value 0 and standard deviation σ=0.0886. These simulations are performed by the Adams method. It is noted that FIG. 4 shows a case in which the dynamic absorber 1 is not provided, while FIG. 5 ($\mu_e=0.05$) and FIG. 6 ($\mu_e=0.025$) show cases in which the dynamic absorber 1 is provided.

Figure 7:
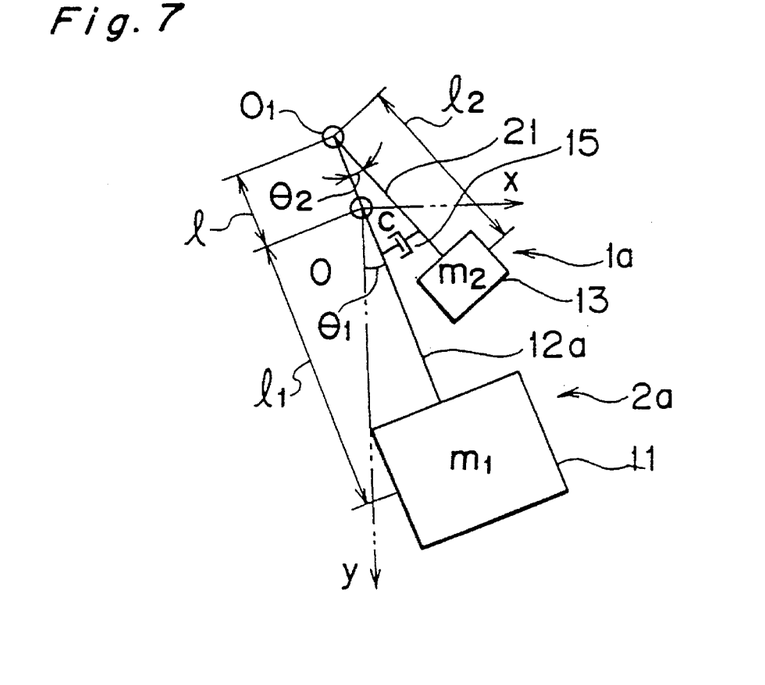
FIG. 7 is a view showing the outline of the overall construction of a pendulum type structure to which a dynamic absorber according to a second embodiment of the present invention is applied.

FIG. 7 schematically illustrates components of a pendulum type structure $2a$ in which a dynamic absorber $1a$ of a pendulum type according to a second embodiment of the present invention is applied. In FIG. 7, parts in common with those of FIG. 1 are designated by the same numerals as in FIG. 1.

A suspended member 11 is suspended so as to be swingable by a supporting portion O (hereinafter, referred to as fulcrum O as in the foregoing description) via a link $12a$, where the suspended member 11 and the link $12a$ constitute pendulum type structure $2a$ with a mass $m_1$ (hereinafter, referred to as a mass $m_1$, as in the foregoing). The dynamic absorber $1a$ is provided above the center of gravity of the mass $m_1$, for example, at a supporting portion $O_1$ (hereinafter, referred to as fulcrum $O_1$) on the link $12a$ positioned on the side opposite to the suspended member 11 with respect to the fulcrum O in this embodiment such that the dynamic absorber 1 applies damping force to the mass $m_1$. Accordingly, the dynamic absorber $1a$, which is not restricted in configuration to but is shown as functionally divided into a link 21 provided such that the dynamic absorber $1a$ can swing around the fulcrum $O_1$, a mass element 13 with a mass $m_2$ (hereinafter, referred to as mass $m_2$ as in the foregoing) suspended to the link 21, and a damper element 15 of a damping coefficient c interposed between the link 21 and the link $12a$.

Further, in operative association with the mass $m_1$, the dynamic absorber 1 is provided above the center of gravity of the mass $m_1$ as in the first embodiment such that the dynamic absorber $1a$ is optimally tuned to the natural vibration of the pendulum motion of the mass $m_1$ depending on the appended mass ratio (mass of appended system/mass of main system), thus applies damping force thereto.

Next, vibration of the mass $m_1$ to which the above-described dynamic absorber $1a$ has been applied is theoretically analyzed.

As shown in FIG. 7, the fulcrum $O_1$ of an appended system pendulum in the dynamic absorber $1a$ is disposed above the fulcrum O of the main system. A distance between the fulcrum $O_1$ and the fulcrum O is l. It is assumed that angular displacement of the link $12a$ of the main system and that of the link 21 of the dynamic absorber $1a$ are $\theta_1$, $\theta_2$, respectively, and lengths from the fulcrums O, $O_1$ to the centers of gravity of the masses m, $m_1$, i.e. lengths of the arms are $l_1$, $l_2$, respectively. Then positions of the main-system and appended-system masses are represented by the following Equations (35) to (38):

$$x_1 = l_1 \sin \theta_1 \quad (35)$$

$$y_1 = l_1 \cos \theta_1 \quad (36)$$

$$x_2 = l_2 \sin(\theta_1+\theta_2) - l \sin \theta_1 \quad (37)$$

$$y_2 = l_2 \cos(\theta_1+\theta_2) - l \cos \theta_1 \quad (38)$$

If the damping coefficient of the appended system is c, external force acting on the main system is $Pe^{i\omega t}$, then linearization by using Lagrange's equation results in the following Equations (39) and (40):

$$(m_1 l_1^2 + m_2 l^2 - 2m_2 l l_2)\ddot{\theta}_1 + (m_2 l_2^2 - m_2 l l_2)\ddot{v}_2 + (m_1 l_1 + m_2 l_2 - m_2 l)g\theta_1 +$$

$$m_2 l_1 g \theta_2 = P l_1 e^{i\omega t} \tag{39}$$

$$(m_2 l_2{}^2 - m_2 l l_2)\ddot{\theta}_1 + m_2 l_2{}^2 \ddot{\theta}_2 + 30\, c l_2{}^2 D\theta_2 + m_2 g l_2 \theta_1 + m_2 g l_2 \theta_2 = 0 \tag{40}$$

These equations are made dimensionless by using symbols used in the following Equation (41) and symbols used in Equation (18), then the equations which give the angular displacements of the main system and the appended system result in the same as Equations (19) and (21). Also, the optimum tuning and the equivalent mass ratio are given by Equations (24), (30), and (32).

$$\gamma = (l_2 - l)/l_1,\ \omega_a{}^2 = g/l_2 \tag{41}$$

Figure 8:
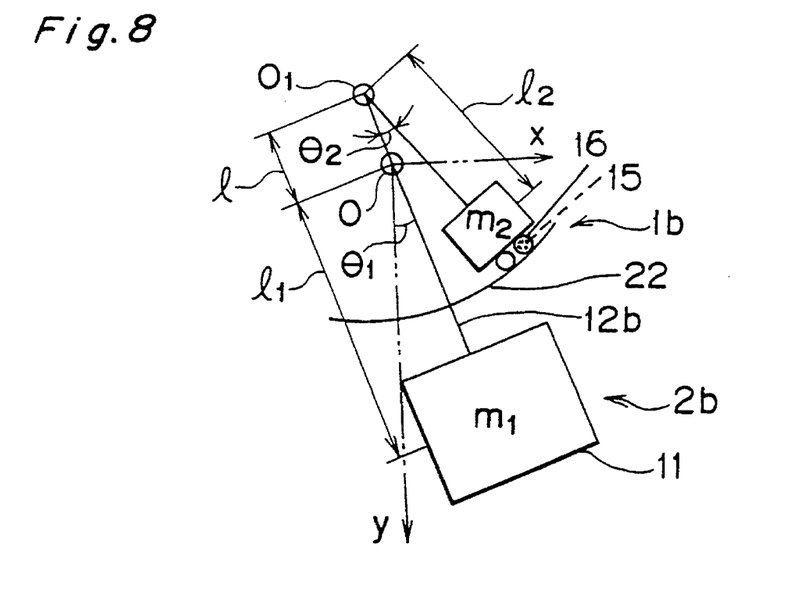
FIG. 8 is a view showing the outline of the overall construction of a pendulum type structure to which dynamic absorber according to a third embodiment of the present invention is applied.

FIG. 8 schematically illustrates components of a pendulum type structure $2b$ using a circular-track type dynamic absorber $1b$ according to a third embodiment of the present invention. In FIG. 8, parts in common with those of FIG. 7 are designated by the same numerals as in FIG. 7. This dynamic absorber $1b$ differs from the counterpart in FIG. 7, in that whereas the mass $m_2$ is suspended from the fulcrum $O_1$ via the link 21 in FIG. 7, the mass $m_2$ is supported on a circular track 22 such that the mass $m_2$ is able to roll on the circular track 22. The circular track 22 is integrated with the link $12b$ in this embodiment, but is substantially the same as in FIG. 7 in terms of dynamics. In addition, in the embodiment as shown in FIG. 8, the damper element 15 is interposed in the rollers, which are rolling elements. Thus, when the mass $m_1$ swings about the fulcrum O together with the circular track 22, the mass $m_2$ acts so as to maintain its own stationary state by law of inertia. As a result, the rollers 16 disposed between the mass $m_1$ and the mass $m_2$ roll along the circular track 22 while being subjected by the damper element 15 to a force for restraining rolling of rollers 16. Furthermore, this restrainment of rolling of rollers 16 restrains swinging movement of the mass $m_1$.

Further, as another embodiment, the mass $m_2$ as shown in FIG. 8 is not used, but instead the mass $m_2$ may be provided for the circular track 22, and the mass $m_2$ may be rolled on a roller portion, relatively to the roller portion which swings integrally with the link $12b$. A damper element may be interposed in the roller portion.

Figure 9:
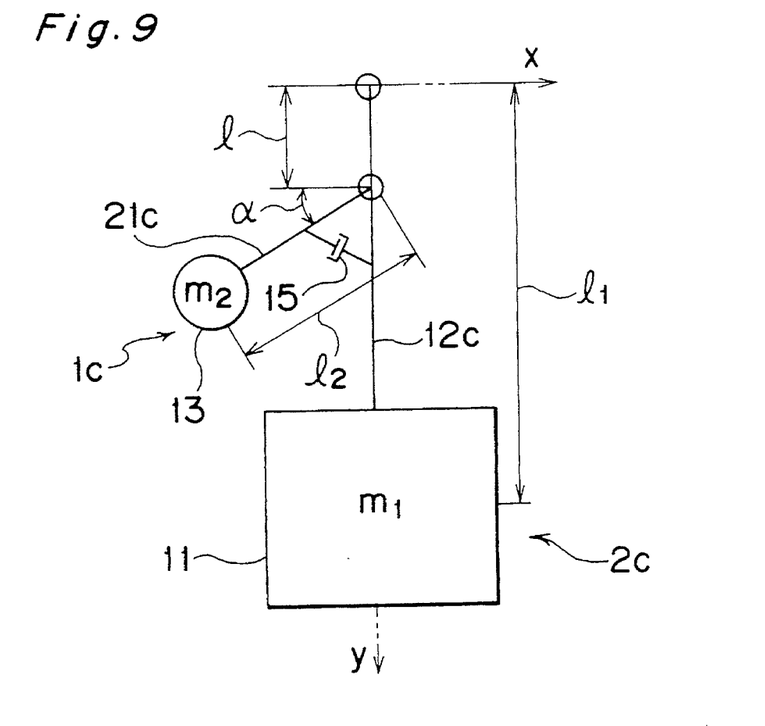
FIG. 9 is a side view showing the outline of the overall construction of a pendulum type structure to which a dynamic absorber according to a fourth embodiment of the present invention is applied.
Figure 10:
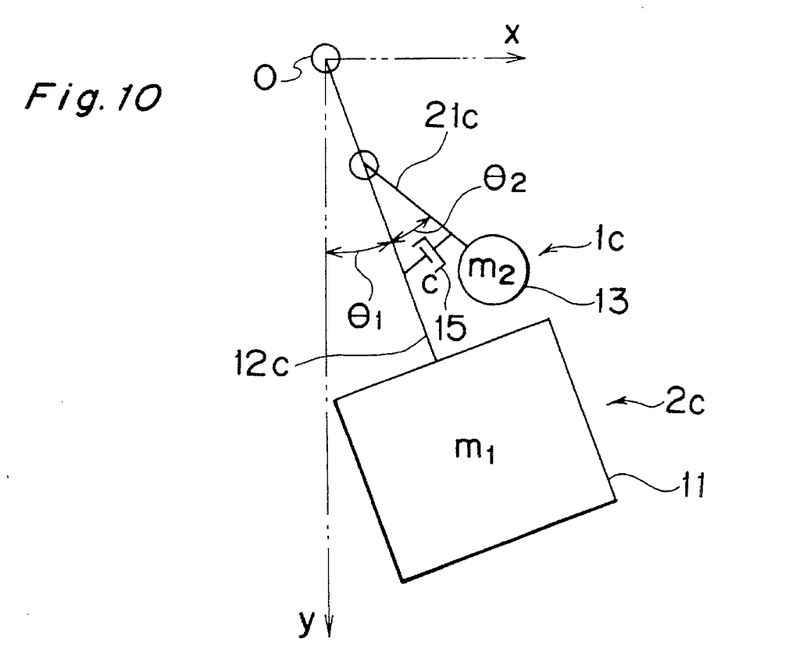
FIG. 10 is a front view showing a state of swing of the embodiment shown in FIG. 9.

FIG. 9 and FIG. 10 schematically illustrate components of a pendulum type structure $2c$ using a dynamic absorber $1c$ of pendulum type according to a fourth embodiment of the present invention. In the figures, parts in common with the above-mentioned embodiments are designated by the same numerals as those in FIG. 9 and FIG. 10, and descriptions thereof are omitted.

This dynamic absorber $1c$, as shown in FIG. 9, is arranged so that while a link $12c$ is kept still in a vertical state, a link $21c$ suspending a mass $m_2$ is inclined with respect to the horizontal direction by an angle $\alpha$ ($0° < \alpha < 90°$) (the sign of $\alpha$ is assumed to be positive in the downward direction in FIG. 9). A damper element 15 is not restricted in configuration to but is shown functionally interposed between the link $12c$ and the link $21c$.

Next, vibration of the mass $m_1$ to which the above-described dynamic absorber 1 has been applied is theoretically analyzed.

In the case of a double pendulum in which an appended system pendulum is provided below the main system, a long period of the main system would result in also a long arm of the appended system pendulum, to a disadvantage in practical use. Thus, the dynamic absorber $1c$ as shown in FIG. 9 and FIG. 10 is made so that a long period is obtained by a short arm. When an appended system pendulum with an arm length of $l_2$ is provided so as to be inclined at an angle $\alpha$ with respect to the horizontal plane, the resulting natural frequency can be represented by the following Equation (42):

$$\omega^2 = \frac{g \sin \alpha}{l_2} \tag{42}$$

As shown in FIG. 10, if an angular displacement of the appended system pendulum is $\theta_2$, then the position of the mass of the main system and that of the appended system can be represented by the following Equations (43) to (46):

$$x_1 = l_1 \sin \theta_1 \tag{43}$$

$$y_1 = l_1 \cos \theta_1 \tag{44}$$

$$\begin{Bmatrix} x_2 \\ y_2 \end{Bmatrix} = \begin{bmatrix} \cos \theta_1 & \sin \theta_1 \\ -\sin \theta_1 & \cos \theta_1 \end{bmatrix} \begin{Bmatrix} l_2 \sin \theta_2 \\ l + l_2 \cos \theta_2 \sin \alpha \end{Bmatrix} \tag{45}$$

$$z_2 = -l_2 \cos \theta_2 \cos \alpha \tag{46}$$

From these equations, Lagrange's equation of motion is prepared and made dimensionless by using symbols as used in the following Equation (47) and symbols as used in Equation (18), displacements of the main system and that of the appended system result in the Equations (19) and (21), as in the preceding embodiment. Optimum adjustment and equivalent mass ratio are also given by the Equations (24), (30), and (32).

$$\gamma = (l_2 l \sin \alpha + l)/l_1,\ \omega_a{}^2 = g \sin \alpha/l_2 \tag{47}$$

Figure 11:
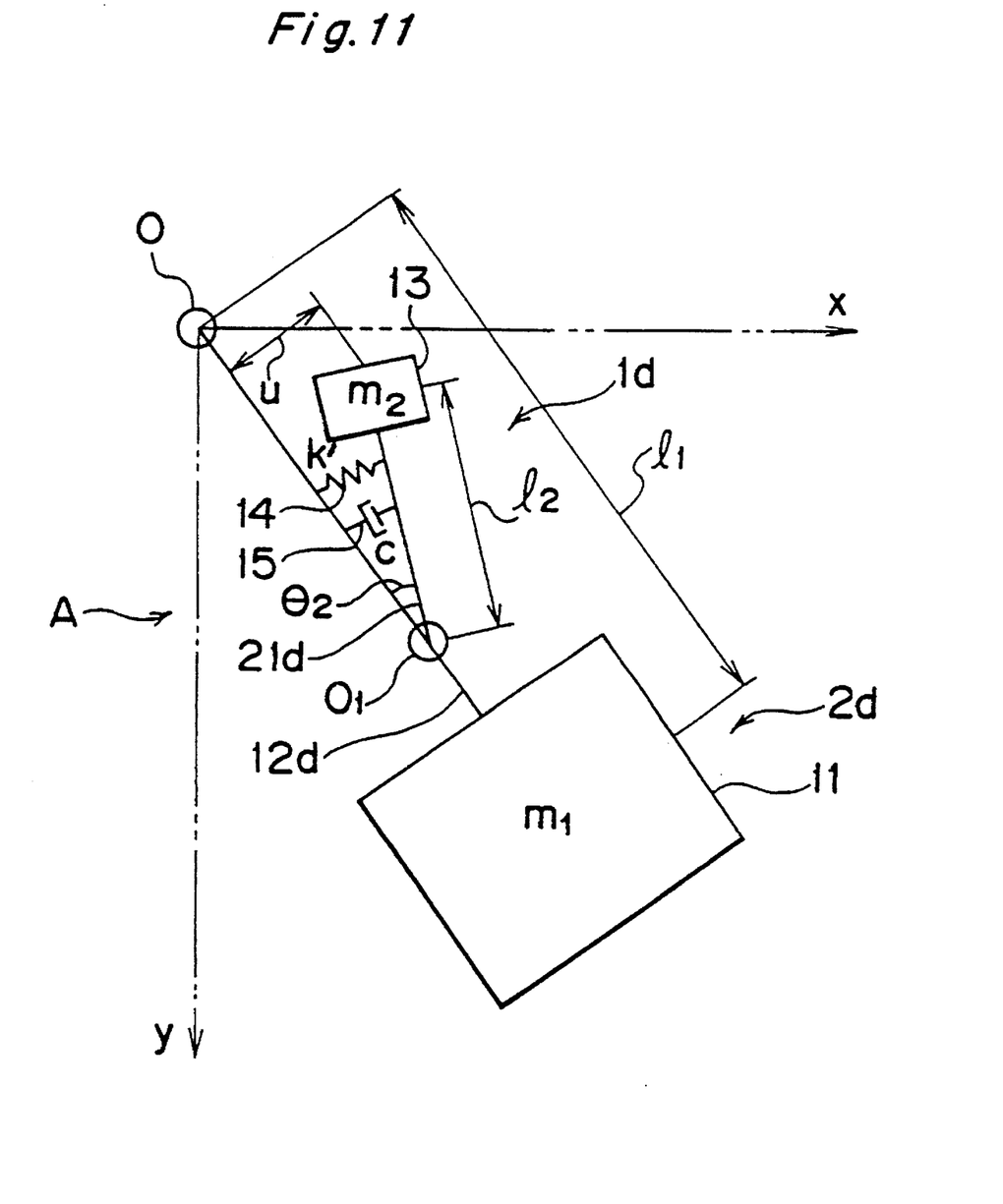
FIG. 11 is a view showing the outline of the overall construction of a pendulum type structure to which a dynamic absorber according to a fifth embodiment of the present invention is applied.
Figure 12:
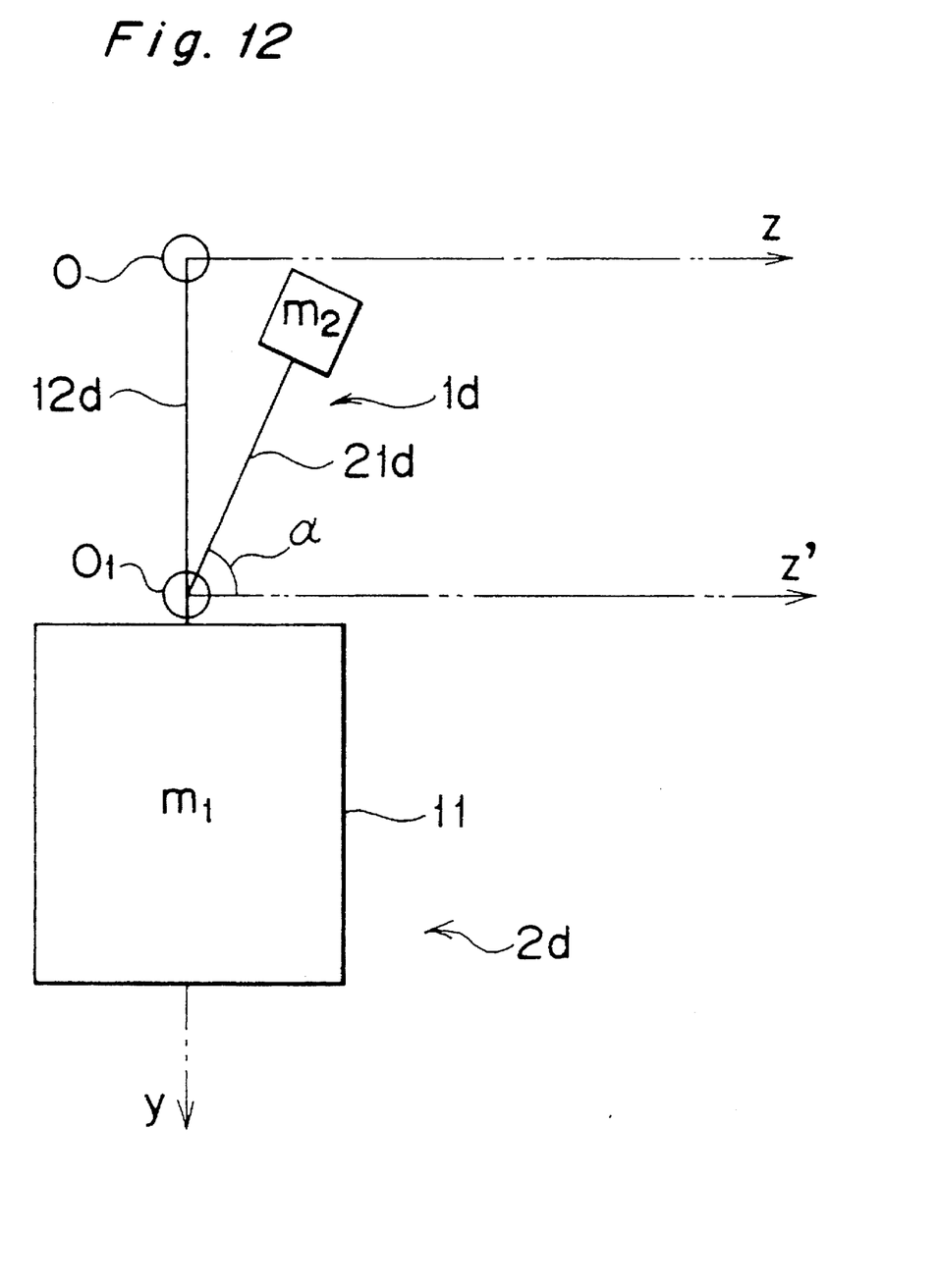
FIG. 12 is a view showing an inclined state of the link that supports the mass $m_2$ of the dynamic absorber shown in FIG. 11, as viewed in the A direction in FIG. 11.

FIG. 11 and FIG. 12 schematically illustrate components of a pendulum type structure $2d$ in which a dynamic absorber $1d$ of an inverted-inclined pendulum type according to a fifth embodiment of the present invention is applied. Parts in common with FIG. 7 are designated by the same numerals as in FIG. 7.

In this embodiment, a suspended member 11 is suspended, so as to be able to swing, by a supporting portion O (hereinafter, referred to as fulcrum O as in the foregoing description) via a link $12d$, where the suspended member 11 and the link $12d$ constitute a pendulum type structure $2d$ with a mass $m_1$ (hereinafter, referred to as mass $m_1$ as in the foregoing). The dynamic absorber $1d$, which comprises a mass element $m_2$ supported by an inverted link $21d$ extending upward from the fulcrum $O_1$ on the link $12d$, a spring element 14 (rotational spring constant: k') interposed between the link $12d$ and the inverted link $21d$, and a damper element 15 (damping coefficient: c), is provided above the center of gravity of the mass $m_1$ such that the dynamic absorber $1d$ can applies damping force to the mass $m_1$.

Also, as shown in FIG. 12, the link $21d$ is inclined at an angle $\alpha$ ($-90 \leq \alpha < 0$) to the z'-axis parallel to the z-axis (the sign of $\alpha$ is assumed to be positive in the downward direction in FIG. 12). In addition, FIG. 12 is given to clarify the angle $\alpha$, and other components which are not directly linked with this purpose are not illustrated in FIG. 12.

It is noted that the theory detailed in connection with the first embodiment is basically applicable to the present embodiment only if Equation (42) and the second Equation of (47) ($\omega_a{}^2 = g \sin \alpha/l_2$), both of which represent the natural frequency of the appended system pendulum, are replaced with equations obtained by adding ($k'/(m_2 \cdot l_2{}^2)$) to right side of each of Equation (42) and the second Equation of (47). Therefore, its description is here omitted.

Figure 13:
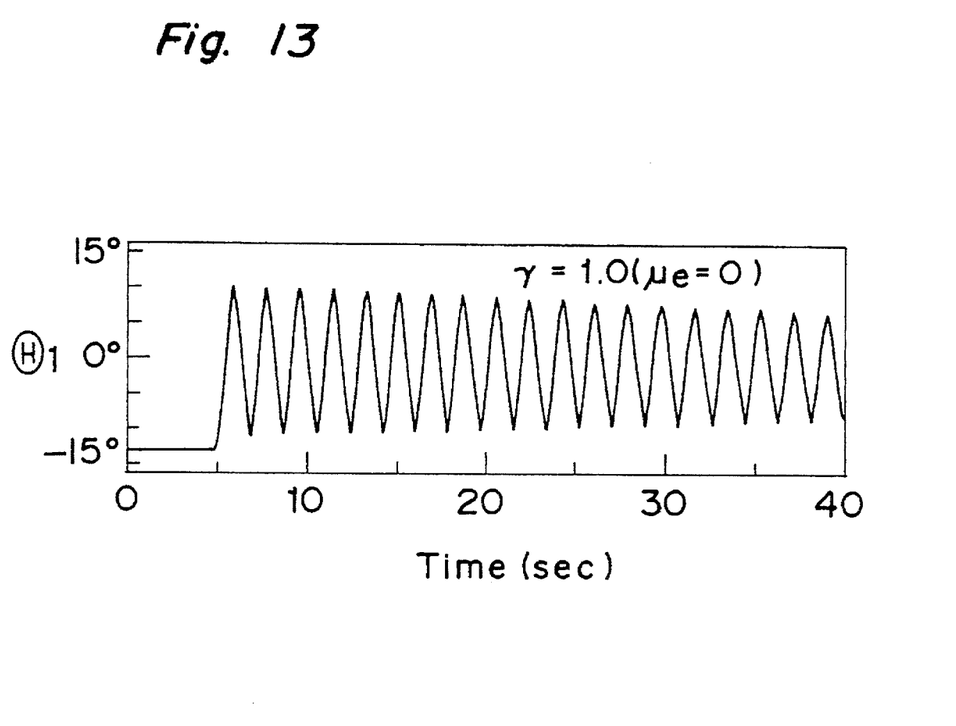
FIG. 13 is a view showing response to an initial displacement, which is a result of an experiment made on a model of the system with the dynamic absorber shown in FIG. 8.
Figure 14:
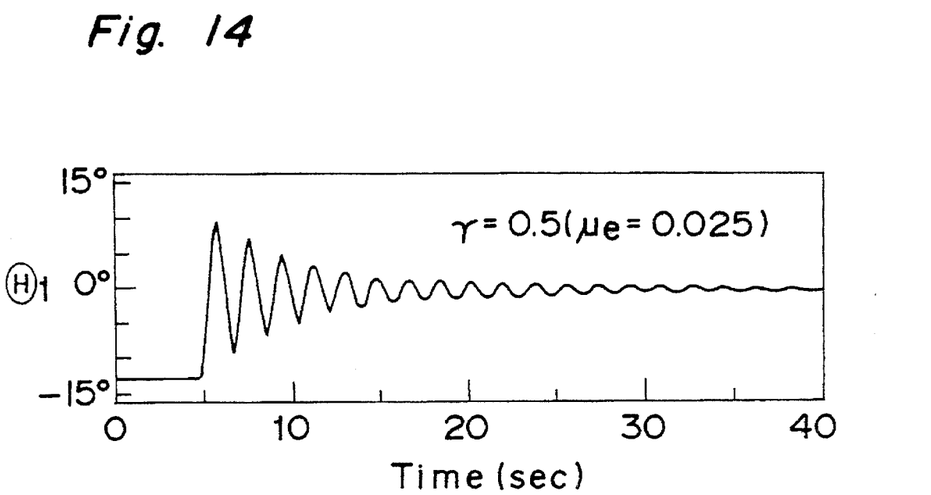
FIG. 14 is a view showing response to an initial displacement, which is a result of an experiment made on a model of the system with the dynamic absorber shown in FIG. 8.
Figure 15:
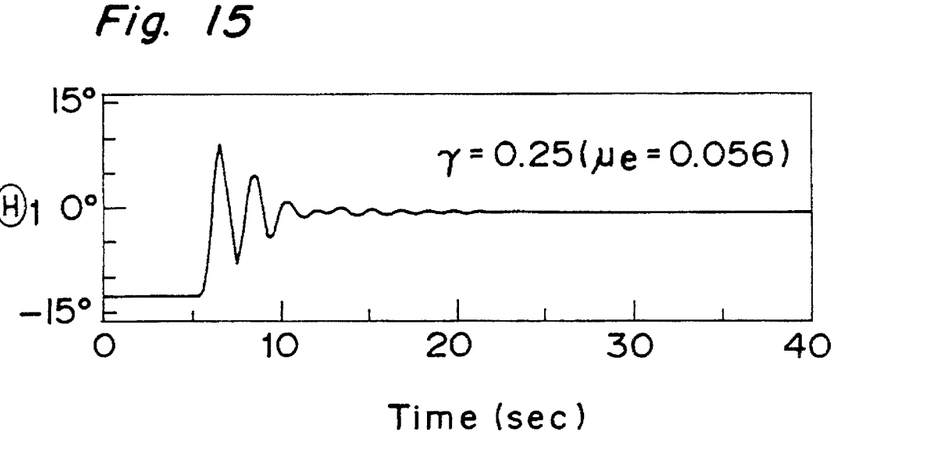
FIG. 15 is a view showing response to an Initial displacement, which is a result of an experiment made on a model of the system with the dynamic absorber shown in FIG. 8.

Next, experiments were made on models using the circular-track type dynamic absorber $1b$ according to the third embodiment as shown in FIG. 8 by way of example. In the experiments, $l_1=1$ m, $m_1=8$ kg, $m_2=0.8$ kg, the radius of the circular track was 1 m. Furthermore, as for the location of the dynamic absorber 1b, three positions: $\gamma=0.25(\mu_e=0.56)$, $0.5(\mu_e=0.025)$, and 1 ($\mu_e=0$) were chosen. Response due to an initial displacement in each case is shown in FIG. 13 to FIG. 15. Like the results of theoretical analysis, almost no damping effect is shown if the dynamic absorber 1b is provided in proximity to the center of gravity of the main system ($\gamma=1$). As the dynamic absorber 1b is provided further above the center of gravity ($\gamma=0.5$, $\gamma=0.25$), greater damping effect is produced. However, in these experiments, damping of the dynamic absorber 1b depends on friction between the dynamic absorber 1b and the circular track 22, and is not tuned to an optimum state.

The present invention is not restricted to cable suspension transporters as its application object, but is applicable to the overall range of pendulum type structures. The damping by the present invention differs from that by dynamic absorbers of conventional translational motion systems in that, in the present invention, the mass of the dynamic absorber as well as the main system is subject to gravity by the inclination of the main system. When the dynamic absorber is provided at the center of gravity of the main system, moment based on the spring force caused by displacement of the dynamic absorber and moment based on the spring force caused by the gravity of the dynamic absorber cancel each other among the moments acting on the main system. As a result, the main system and the dynamic absorber is of such an arrangement that two systems having the same natural frequency are coupled with each other by a damper, thus integrally swinging. However, if the dynamic absorber is positioned away from the center of gravity of the main system, moment acts on the main system from the dynamic absorber.

As described above, for the present invention, taking the location of the absorber as a parameter, damping by dynamic absorbers of spring mass type, pendulum type, circular-track type, inclining pendulum type, and inverted inclining pendulum type can be analyzed, thus explained by generalized theoretical formula. The optimum adjustment and the equivalent mass ratio representing damping effect are obtained by multiplying the mass ratio $\mu$ of the dynamic absorber and the main system by $(1-\gamma)^2$ (where $\gamma$ is a result of dividing the distance from the fulcrum to the point where the dynamic absorber is provided by the length of the arm of the main system). Accordingly, for damping vibrations, the dynamic absorber is preferably installed upward as much as possible.

In addition, the first to fifth embodiments have been described, where only one unit of the dynamic absorbers 1 to 1d is provided in each embodiment. However, the present invention is not restricted to this, but includes cases where a plurality of the dynamic absorbers 1 to 1d are provided to balance the pendulum type structures 2–2d in the direction of progress, i.e. in the direction vertical to the x-y plane. For example, in the case of FIG. 12, in addition to the dynamic absorber 1d as shown in the figure, one more dynamic absorber 1d may be provided at a position symmetrical in the z-axis direction with respect to the y-axis.

As apparent from the above description, according to the present invention, one or more dynamic absorbers are provided above the center of gravity of a pendulum type structure in combination with the pendulum type structure, in such a way that the dynamic absorbers can apply damping force to the pendulum type structure.

Accordingly, as described in detail above, a relative displacement is generated between the mass element of a dynamic absorber and a pendulum type structure supporting it, so that vibration energy of the pendulum type structure is absorbed. As a result, damping effect to the pendulum type structure can be exerted clearly without requiring any power such as an electric power supply or elongating the arm of the pendulum. Thus, the swing of the pendulum type structure can be suppressed with enhanced effect, thereby resulting in a wider variety of applications of the pendulum type structure, advantageously.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A dynamic absorber on a pendulum type structure having a body swingably suspended from a supporting portion by a link, said dynamic absorber being located above a center of gravity of the pendulum type structure such that the dynamic absorber applies damping force to the pendulum type structure and said dynamic absorber comprising a mass element moveable under the action of gravity to apply a damping force to the pendulum type structure and a damper element for restraining movement of said mass element.

2. The invention as claimed in claim 1, wherein said mass element is linearly movable transversely of said link, a spring element interposed between said mass element and said link, and said damper element which operates in parallel to said spring element, wherein said mass element is optimally tuned to a natural vibration of a pendulum motion of said pendulum type structure.

3. The invention as claimed in claim 1, wherein said mass element is suspended by a second link provided swingably at a supporting portion positioned above a center of gravity of the pendulum type structure, and said damper element interposed between said two links, wherein said mass element is optimally tuned to a natural vibration of a pendulum motion of said pendulum type structure.

4. The invention as claimed in claim 1, wherein said mass element is suspended by a second link, said second link being structured and arranged to swing relative to said link suspending said body, and being inclined with respect to a horizontal direction while said link suspending said body is kept still in a vertical state, and said damper element interposed between said two links, wherein said mass element is optimally tuned to a natural vibration of a pendulum motion of the pendulum type structure.

5. The invention as claimed in claim 1, wherein said mass element is supported by an inverted link provided swingably relative to said link suspending said body, and said damper element interposed between said two links, wherein said mass element is optimally tuned to a natural vibration of a pendulum motion of the pendulum type structure.

6. A dynamic absorber on a pendulum type structure having a body swingably suspended from a supporting portion through a link, said dynamic absorber being located above a center of gravity of the pendulum type structure such that the dynamic absorber applies damping force to the pendulum type structure and comprising a mass element provided on a general circular track formed integrally with said link and structured and arranged such that said mass element is capable of rolling on said track, and a damper element for restraining rolling of said mass element,
wherein said mass element is optimally tuned to a natural vibration of a pendulum motion of said pendulum type structure depending on a ratio of the mass of the mass element to the mass of the body.

7. The invention as claimed in claim 6, wherein said mass element includes at least one roller for rolling said mass element on said track and wherein said damper element is disposed within said roller.

* * * * *